United States Patent
Mathias et al.

(10) Patent No.: US 10,680,266 B2
(45) Date of Patent: Jun. 9, 2020

(54) METHOD OF MANUFACTURING AN INTEGRATED WATER VAPOR TRANSFER DEVICE AND FUEL CELL-II

(71) Applicant: GM GLOBAL TECHNOLOGY OPERATIONS LLC, Detroit, MI (US)

(72) Inventors: Mark F. Mathias, Rochester Hills, MI (US); Balasubramanian Lakshmanan, Rochester Hills, MI (US); Swaminatha P. Kumaraguru, Rochester Hills, MI (US); Scott C. Moose, Linden, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 28 days.

(21) Appl. No.: 15/897,243

(22) Filed: Feb. 15, 2018

(65) Prior Publication Data
US 2019/0252705 A1 Aug. 15, 2019

(51) Int. Cl.
| | |
|---|---|
| *H01M 8/1004* | (2016.01) |
| *H01M 8/04119* | (2016.01) |
| *H01M 8/1081* | (2016.01) |
| *H01M 8/1058* | (2016.01) |
| *H01M 4/88* | (2006.01) |
| *H01M 8/1018* | (2016.01) |

(52) U.S. Cl.
CPC ....... *H01M 8/1004* (2013.01); *H01M 4/8807* (2013.01); *H01M 4/8825* (2013.01); *H01M 4/8882* (2013.01); *H01M 8/04149* (2013.01); *H01M 8/1058* (2013.01); *H01M 8/1081* (2013.01); *H01M 2008/1095* (2013.01); *H01M 2250/20* (2013.01)

(58) Field of Classification Search
CPC ..... H01M 2008/1095; H01M 2250/20; H01M 4/8807; H01M 4/8825; H01M 4/8882; H01M 8/04149; H01M 8/1004; H01M 8/1058; H01M 8/1081
See application file for complete search history.

(56) References Cited

U.S. PATENT DOCUMENTS

| | | | |
|---|---|---|---|
| 2006/0105227 A1* | 5/2006 | Kim ................... | H01M 4/8605 429/483 |
| 2011/0053037 A1* | 3/2011 | MacKinnon ...... | H01M 8/04149 429/483 |
| 2011/0143254 A1* | 6/2011 | Kongkanand ......... | H01M 4/861 429/483 |
| 2014/0261982 A1* | 9/2014 | Moose ................ | H01M 4/8825 156/182 |
| 2019/0044153 A1* | 2/2019 | Sode ................... | H01M 4/8807 |

OTHER PUBLICATIONS

DuPont Fuel Cells, DuPont Nafion PFSA Polymer Dispersions, 2009 (Year: 2009).*

* cited by examiner

*Primary Examiner* — Stewart A Fraser
*Assistant Examiner* — Victoria H Lynch
(74) *Attorney, Agent, or Firm* — Quinn IP Law

(57) ABSTRACT

The present disclosure provides a method for manufacturing an integrated MEA, the method includes the following steps: (1) providing a substrate having an AA region and a WVT region; (2) simultaneously coating a microporous layer, a catalyst layer, and a first membrane ionomer layer onto the substrate; (3) applying an optional membrane support layer to the first membrane ionomer layer in the AA region and the WVT region; (4) applying an optional second membrane ionomer layer; (5) heating treating a coated substrate; and (6) assembling the coated substrate to a companion coated substrate.

27 Claims, 13 Drawing Sheets

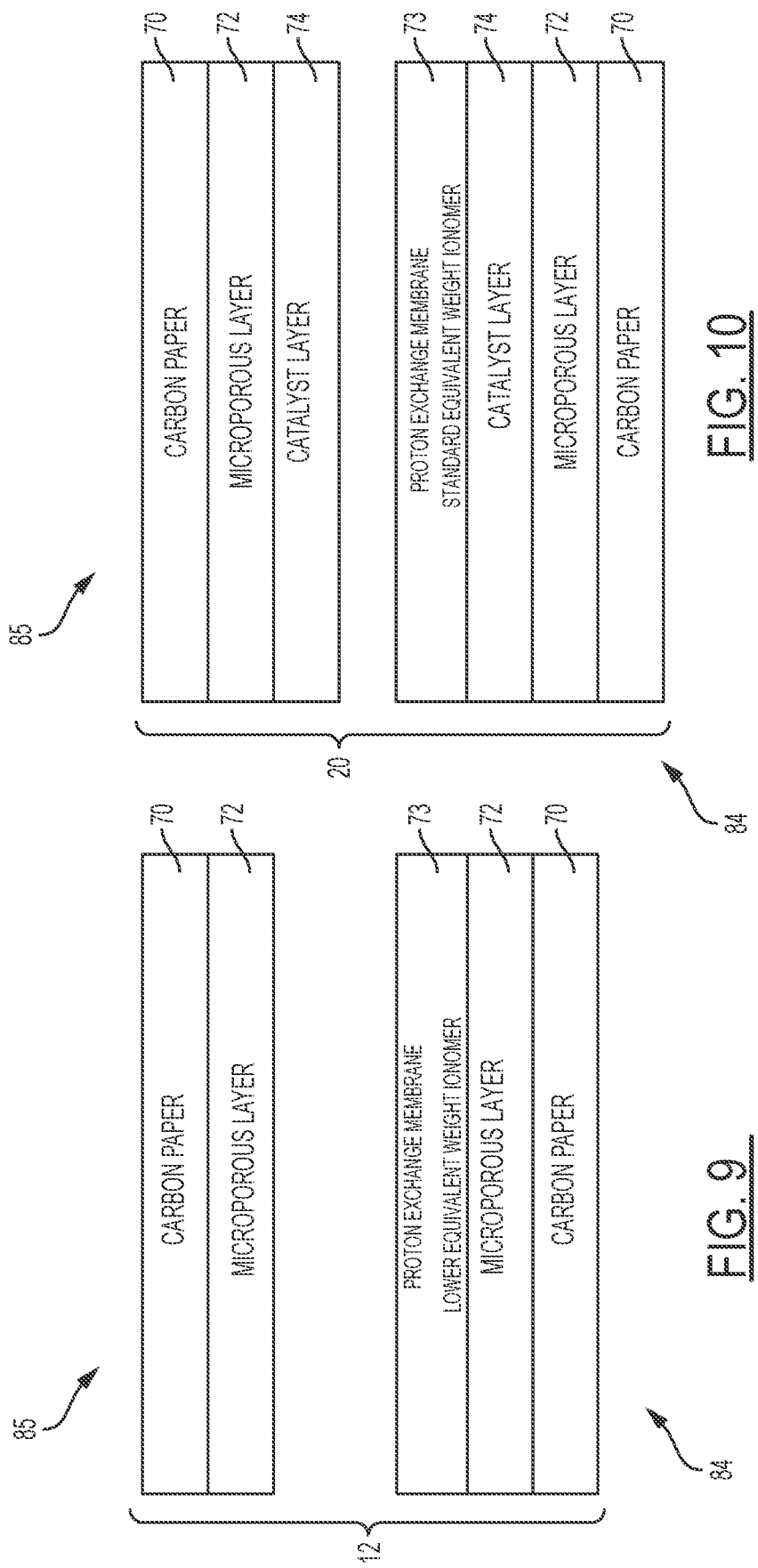

METHOD OF MANUFACTURING AN INTEGRATED WATER VAPOR TRANSFER DEVICE AND FUEL CELL-II

TECHNICAL FIELD

The invention relates to a method of manufacturing an integrated membrane electrode assembly (MEA) having a water vapor transfer (WVT) region.

BACKGROUND

Fuel cell stack systems are used as power sources for electric vehicles, stationary power supplies, and other applications. One known fuel cell stack system is the proton exchange membrane (PEM) fuel cell stack system that includes a membrane electrode assembly (MEA) comprising a thin, solid polymer electrolyte membrane having an anode on one face and a cathode on the opposite face. The MEA is sandwiched between a pair of electrically conductive contact elements which serve as current collectors for the anode and cathode, which may contain appropriate channels and openings therein for distributing the fuel cell stack system's gaseous reactants (i.e., H2 and O2 or air) over the surfaces of the respective anode and cathode.

PEM fuel cells comprise a plurality of the MEAs stacked together in electrical series while being separated by an impermeable, electrically conductive contact element known as a bipolar plate or current collector. The fuel cell stack systems are operated in a manner that maintains the MEAs in a humidified state. The level of humidity of the MEAs affects the performance of the fuel cell stack system. Additionally, if an MEA is operated too dry, the performance and useful life of the MEA can be reduced. To avoid drying out the MEAs, the typical fuel cell stack systems are operated with the MEA at a desired humidity level, wherein liquid water is formed in the fuel cell during the production of electricity. Additionally, the cathode and anode reactant gases being supplied to the fuel cell stack system are also humidified to prevent the drying of the MEAs in the locations proximate the inlets for the reactant gases. Traditionally, a water vapor transfer (WVT) unit is utilized to humidify the cathode reactant gas prior to entering into the fuel cell. See, for example, U.S. Pat. No. 7,138,197 by Forte et al., incorporated herein by referenced in its entirety, a method of operating a fuel cell stack system.

The basic components of a PEM-type fuel cell are two electrodes separated by a polymer membrane electrolyte. Each electrode is positioned on opposite sides of the membrane as a thin catalyst layer. Similarly, on each side of the assembly adjacent to each thin catalyst layer, a microporous layer (MPL) is coated on a gas diffusion substrate to produce a gas diffusion layer wherein the gas diffusion layer is the outermost layer on each side of the membrane electrode assembly (MEA). The gas diffusion substrate is commonly composed of non-woven carbon fiber paper or woven carbon cloth. The GDL is primarily provided to enable conductivity, and to allow gases to come in contact with the catalyst. The GDL works as a support for the catalyst layer, provides good mechanical strength and easy gas access to the catalyst and provides the electrical conductivity. The purpose of the microporous layer is to minimize the contact resistance between the GDL and catalyst layer; limit the loss of catalyst to the GDL interior and help to improve water management as it provides effective water transport. Accordingly, the electrodes (catalyst layers), membrane, microporous layers, and gas diffusion layer together form the membrane electrode assembly (MEA). The MEA is generally disposed between two bipolar plates to form a fuel cell arrangement.

As is known, hydrogen is supplied to the fuel cells in a fuel cell stack to cause the necessary chemical reaction to power the vehicle using electricity. One of the byproducts of this chemical reaction in a traditional fuel cell is water in the form of vapor and/or liquid. It is also desirable to provide humid air as an input to the fuel cell stack to maximize the performance output for a given fuel cell stack size. Humid air also prevents premature mechanical and chemical degradation of the fuel cell membrane.

The input air is typically supplied by a compressor while a water transfer device external to the stack is traditionally implemented in a fuel cell system to add moisture to the input air supplied by a compressor, the source of the moisture often coming from the product-water-laden stack cathode outlet stream. These components among many other components in a traditional fuel cell system contribute to the cost of the fuel cell system and also require packaging space. In many applications, such as but not limited to a vehicle, packaging space is limited.

Accordingly, there is a need to integrate components of a fuel cell system where possible at a reasonable cost.

SUMMARY

The present disclosure provides a method for manufacturing a membrane electrode assembly (MEA) having an integrated water vapor transfer (WVT) region wherein certain layers of the MEA are simultaneously stripe-coated. The first embodiment method includes the following steps: (1) providing a substrate having an active area (AA) region and a WVT region; (2) simultaneously coating a microporous layer (MPL), a catalyst-containing layer, and a first membrane ionomer layer onto the substrate; (3) optionally applying a membrane support layer to the first membrane ionomer layer in the AA region and the WVT region; (4) optionally applying a second membrane ionomer layer; and (5) heat treating the coated substrate formed by the substrate and a plurality of layers; and (6) assembling the coated substrate to a companion coated substrate. A multi-layer slot-die coating tool may be implemented to apply or coat the microporous layer, the catalyst layer, and the first membrane ionomer layer simultaneously onto the substrate wherein the substrate is a gas diffusion media.

With respect to all embodiments of the present disclosure, the coated substrate may be heat-treated before assembling the coated substrate to a companion coated substrate. A die-coating tool may be implemented to apply or coat the microporous layer, the catalyst-containing layer, and the first membrane ionomer layer simultaneously onto the substrate wherein the substrate is a gas diffusion media. Moreover, with respect to all embodiments of the present disclosure, the WVT region may be defined at a first end of the substrate with the AA region being defined across the remainder of the substrate in the middle region extending to the second end of the substrate. Alternatively, with respect to all embodiments of the present disclosure, the WVT region may be defined at the first end of the substrate and at a second end of the substrate with the AA region disposed therebetween. It is understood that the membrane support layer implemented in all embodiments of the present disclosure, may but not necessarily, be formed from ePTFE (expanded polytetrafluoroethylene). Furthermore, in the embodiments having a WVT region which is defined at the first end and the second end with the AA region in between, the catalyst layer in the catalyst containing layer in the various embodiments may, but not necessarily extend into one of the two WVT regions (shown for example in FIG. 4) create a WVT region on either the first end or the second, or on both ends—first and second ends (FIG. 4). However, in doing so, the catalyst in one of the catalyst containing layers (of either the coated substrate or the companion coated substrate) must be removed so that the WVT region has, at most, one catalyst layer between the coated substrate and the catalyst coated substrate.

With reference to the first embodiment, the catalyst-containing layer may be coated using a single catalyst solution applied solely to the AA region. Therefore, the AA region of the coated substrate includes a substrate layer, the microporous layer, the catalyst layer, the first membrane ionomer layer, the optional membrane support layer, and the optional second membrane ionomer layer. Moreover, the WVT region of the coated substrate includes the substrate layer, the microporous layer, the first membrane ionomer layer, the optional membrane support layer, and the optional second membrane ionomer layer.

Alternatively, the catalyst-containing layer may be stripe-coated such that a catalyst layer is applied solely to the AA region and a mixed carbon/ionomer layer is optionally applied to the WVT region. Therefore, where the catalyst layer is stripe-coated, the WVT region of the coated substrate may include the substrate layer, the microporous layer, a mixed carbon/ionomer layer, the first membrane ionomer layer, the optional membrane support layer, and the optional second membrane ionomer layer.

In yet another embodiment of the present disclosure, the method for manufacturing an integrated MEA may include the steps of: (1) providing a substrate having an AA region and a WVT region; (2) coating a microporous layer across the substrate; (3) simultaneously coating a catalyst layer onto the microporous layer in the AA region and a first membrane ionomer layer in both the AA and WVT regions; (4) applying an optional membrane support layer to the first membrane ionomer layer in the AA region and the WVT region; (5) coating the optional second membrane ionomer layer onto the membrane support layer thereby forming a coated substrate; and (6) assembling the coated substrate to a companion coated substrate. The coated substrate may be heat-treated before assembling the coated substrate to a companion coated substrate.

In this embodiment, the AA region of the coated substrate may include the substrate layer, the microporous layer, the catalyst layer, the first membrane ionomer layer, the optional membrane support layer, and the optional second membrane ionomer layer. The WVT region of the coated substrate may include the substrate layer, the microporous layer, the optional carbon/ionomer layer, the first membrane ionomer layer, the optional membrane support layer, and the optional second membrane ionomer layer. In this embodiment, a die-coating tool may also be implemented to apply or coat the catalyst layer, and the first membrane ionomer layer simultaneously onto the substrate wherein the substrate is a gas diffusion media.

In yet another embodiment of the present disclosure, a method for manufacturing an integrated MEA may include the steps of: (1) providing a substrate having an AA region and a WVT region; (2) simultaneously applying a stripe-coated microporous layer, a stripe-coated catalyst-containing layer, and a stripe-coated first membrane ionomer layer onto the AA region and WVT region of the substrate; (3) applying an optional membrane support layer onto the first membrane ionomer layer across the AA region and the WVT region; (4) stripe coating the optional second membrane ionomer layer onto the membrane support layer thereby forming a coated substrate; and (5) assembling the coated substrate to a companion coated substrate. In this embodiment, the microporous layer is hydrophobic in the AA region and hydrophilic in the WVT region while the catalyst-containing layer includes a catalyst solely in the AA region and an optional mixed carbon/ionomer layer in the WVT region. The first membrane ionomer layer includes the first fuel cell membrane ionomer layer in the AA region and an optional WVT membrane ionomer in the MT region. The second membrane ionomer layer includes a second fuel cell membrane ionomer layer in the AA and an optional WVT membrane ionomer in the WVT region.

In this embodiment, the AA region of the coated substrate includes a substrate layer, the hydrophobic microporous layer, the catalyst layer, the first fuel cell membrane ionomer layer, the optional membrane support layer, and the optional second fuel cell membrane ionomer layer. The WVT region of the coated substrate includes a substrate layer, a hydrophilic microporous layer, the optional mixed carbon/ionomer layer, the optional first WVT membrane ionomer layer, the optional membrane support layer, and the optional second WVT membrane ionomer layer.

In yet another embodiment of the present disclosure, a method for manufacturing an integrated MEA includes the steps of: (1) providing a substrate having an AA region and a MT region; (2) providing a stripe-coated microporous layer onto the substrate in the AA region and the WVT region; (3) simultaneously coating a stripe-coated catalyst-containing layer, and a stripe-coated first membrane ionomer layer onto the AA region and MT region; (4) applying an optional membrane support layer onto the stripe-coated first membrane ionomer layer; (5) applying an optional stripe-coated second membrane ionomer layer onto the membrane support layer thereby forming a coated substrate; and (6) heat treating the coated substrate formed by the substrate and a plurality of layers; and (7) assembling the coated substrate to a companion coated substrate. The microporous layer is hydrophobic in the AA region and hydrophilic in the WVT region while the catalyst-containing layer includes a catalyst solution solely applied to form a layer in the AA region and an optional mixed carbon/ionomer layer solely applied to the WVT region. The first stripe-coated membrane ionomer layer of this embodiment includes a first fuel cell membrane ionomer solution in the AA region and an optional first WVT membrane ionomer solution applied in the WVT region. The second stripe-coated membrane ionomer layer includes a second fuel cell membrane ionomer solution applied in the AA region and a second optional WVT membrane ionomer solution applied in the WVT region.

In this embodiment, the AA region of the coated substrate includes the substrate layer, a hydrophobic microporous layer, a catalyst layer, a first fuel cell membrane ionomer layer, the optional membrane support layer, and an optional second fuel cell membrane ionomer. The WVT region of the coated substrate includes the substrate layer, the hydrophilic microporous layer, the mixed carbon/ionomer layer, the first ionomer layer (or the optional first WVT membrane ionomer layer), the optional membrane support layer, and the optional second WVT membrane ionomer layer.

The present disclosure and its particular features and advantages will become more apparent from the following detailed description considered with reference to the accompanying drawings.

BRIEF DESCRIPTION OF THE DRAWINGS

These and other features and advantages of the present disclosure will be apparent from the following detailed description, best mode, claims, and accompanying drawings in which:

FIG. 9 illustrates an expanded cross-sectional view of an example WVT region of a membrane electrode assembly having a coated substrate and a companion coated substrate along line 9-9 in FIG. 5.

FIG. 10 illustrates an expanded view of an example AA region of a membrane electrode assembly having a coated substrate and a companion coated substrate along line 10-10 in FIG. 5.

Like reference numerals refer to like parts throughout the description of several views of the drawings.

DETAILED DESCRIPTION

Figure 1:
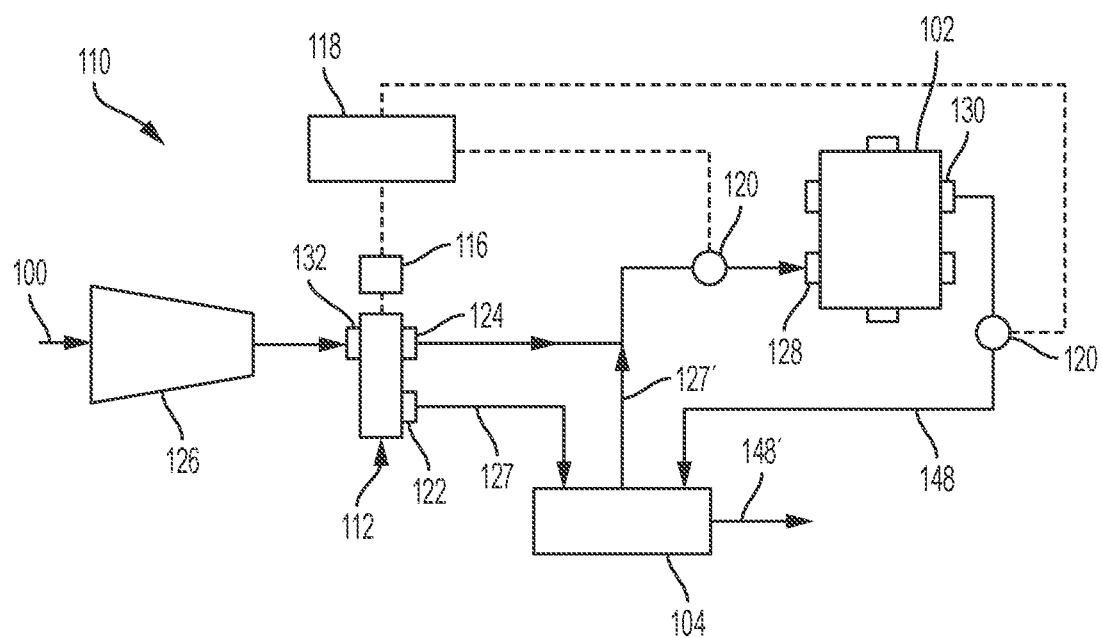
FIG. 1 is an example schematic diagram of a traditional fuel cell system.

Reference will now be made in detail to presently preferred compositions, embodiments and methods of the present disclosure, which constitute the best modes of practicing the present disclosure presently known to the inventors. The figures are not necessarily to scale. However, it is to be understood that the disclosed embodiments are merely exemplary of the present disclosure that may be embodied in various and alternative forms. Therefore, specific details disclosed herein are not to be interpreted as limiting, but merely as a representative basis for any aspect of the present disclosure and/or as a representative basis for teaching one skilled in the art to variously employ the present disclosure.

Except in the examples, or where otherwise expressly indicated, all numerical quantities in this description indicating amounts of material or conditions of reaction and/or use are to be understood as modified by the word "about" in describing the broadest scope of the present disclosure. Practice within the numerical limits stated is generally preferred. Also, unless expressly stated to the contrary: percent, "parts of," and ratio values are by weight; the description of a group or class of materials as suitable or preferred for a given purpose in connection with the present disclosure implies that mixtures of any two or more of the members of the group or class are equally suitable or preferred; the first definition of an acronym or other abbreviation applies to all subsequent uses herein of the same abbreviation and applies to normal grammatical variations of the initially defined abbreviation; and, unless expressly stated to the contrary, measurement of a property is determined by the same technique as previously or later referenced for the same property.

It is also to be understood that this present disclosure is not limited to the specific embodiments and methods described below, as specific components and/or conditions may, of course, vary. Furthermore, the terminology used herein is used only for the purpose of describing particular embodiments of the present disclosure and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, un-recited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

The terms "comprising", "consisting of", and "consisting essentially of" can be alternatively used. Where one of these three terms is used, the presently disclosed and claimed subject matter can include the use of either of the other two terms.

Throughout this application, where publications are referenced, the disclosures of these publications in their entireties are hereby incorporated by reference into this application to more fully describe the state of the art to which this present disclosure pertains.

FIG. 1 shows a schematic cathode subsystem of a fuel cell system 110 known in the art. As shown, the typical water vapor transfer (WVT) device 104 is located away from a cathode outlet 130 and a cathode inlet 128 of the fuel cell stack of the fuel cell stack system. The traditional fuel cell system may, but not necessarily, include a charge air cooler (CAC) and/or diverter 112 together with the water vapor transfer device 104 (such as a humidifier) to regulate a relative humidity of the fuel cell 102. The charge air cooler and/or diverter 112 may have the first inlet 132, the first outlet 124, and the second outlet 122. The traditional fuel cell system may further include the fuel cell 102 and an air compressor 126 as shown. The fuel cell 102 has a plurality of fuel cells, a cathode inlet 128, and a cathode outlet 130. The air compressor 126 is in fluid communication with the fuel cell 102 and adapted to provide a flow of charged air thereto. The WVT device 104 is generally an external component to the fuel cell stack and the WVT device 104 is in fluid communication with the air compressor 126 and the fuel cell 102 as shown. The WVT device 104 is adapted to selectively humidify the charged air provided to the fuel cell 102. The WVT device 104 may transfer moisture to the input charged air 127 (coming from the compressor 126) from the moist cathode exhaust stream 148 exiting the cathode outlet 130 via a membrane (not shown). Thus, the output charged air 127' from the WVT device has sufficient humidity for use in the fuel cell 102. Other suitable means for humidifying the charged air may also be employed.

The optional charge air cooler (and/or diverter) 112 is disposed in communication with the air compressor 126 and each of the fuel cell 102 and the WVT device 104. The first inlet 132 is in fluid communication with the air compressor 126. The first outlet 124 is in fluid communication with the fuel cell 102. The air compressor 126 draws in ambient air 100 and is in fluid communication with the WVT device 104 (via optional CAC and/or diverter 112). The second outlet 122 is in fluid communication with the WVT device 104. The charge air cooler (and/or three-way diverter) shown as element 112 is adapted to: a) cause charged air to bypass the WVT device 104 and flow to the fuel cell 102; and/or b) cause charged air to flow to the WVT device 104—to regulate the humidity of the fuel cell 102.

The example known fuel system of FIG. 1 may include the actuator 116, the controller 118, and at least one humidity sensor 120. The fuel cell system controller 118 may be in electrical communication with the actuator 116. The controller 118 regulates the humidity of the fuel cell 102 via actuator and/or WVT. A humidity sensor 120 may be provided in electrical communication with the controller in order to provide feedback of the charged air relative humidity to the controller 118. However, it is noted that more commonly known fuel cell systems eliminate the use of humidity sensors and instead use the high frequency (i.e. membrane) resistance of the stack to indirectly measure the moisture in the system. Nonetheless, regardless of whether humidity sensors are implemented, many fuel cell systems generally implement an external WVT device 104 as shown which requires space and thus increases the overall size of the fuel cell system. Packaging space for a fuel cell system can be particularly restrictive in applications such as, but not limited to vehicles. Thus, it is desirable to reduce the volume of such fuel cell systems especially in vehicle applications.

Figure 2:
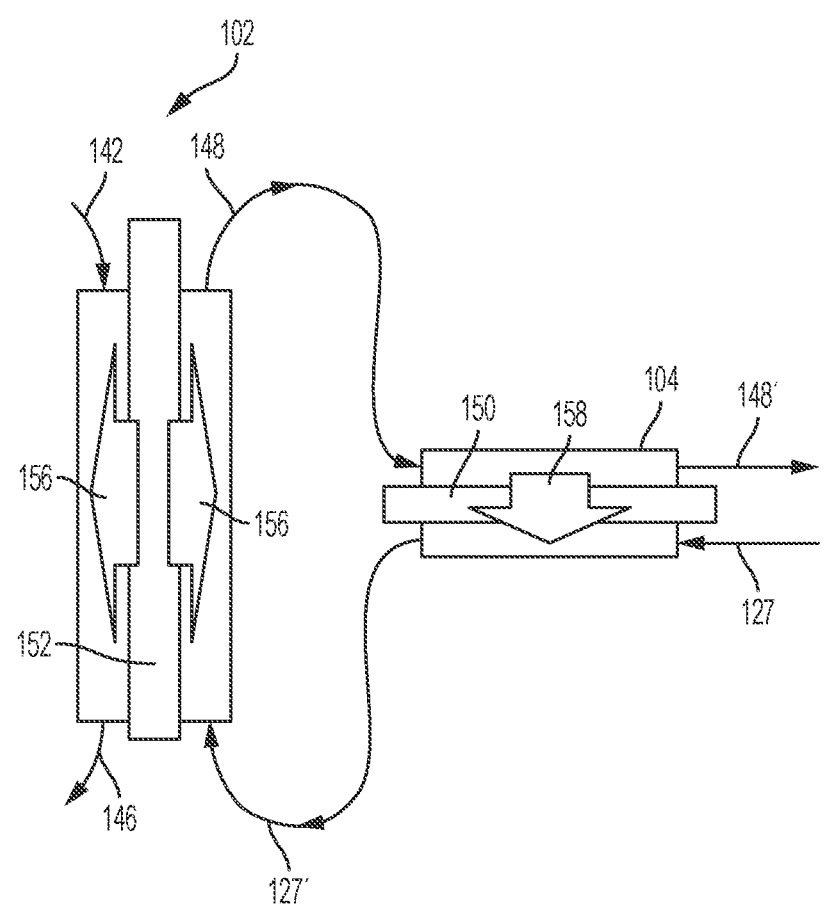
FIG. 2 is a schematic diagram of a traditional water vapor transfer unit which is external to a fuel cell in a fuel cell stack.

FIG. 2 shows a more detailed schematic of a traditional fuel cell and external water vapor transfer device. Input charged air 127 from the compressor 126 (and/or optionally CAC & Diverter 112) enters the WVT device 104. The WVT membrane 150 is configured to transfer moisture 158 from the moist cathode exhaust gas stream 148 thereby creating humidified output charged air 127' to enter the fuel cell 102 at the cathode inlet 128 (see FIG. 1). The cathode exhaust stream 148 exits the fuel cell 102 as moisture rich air due to the water byproduct 156 from the reaction on the MEA 152 in the fuel cell 102. It is understood that after passing through the WVT device 104, the cathode exhaust stream 148' has a reduced moisture content.

Figure 3:
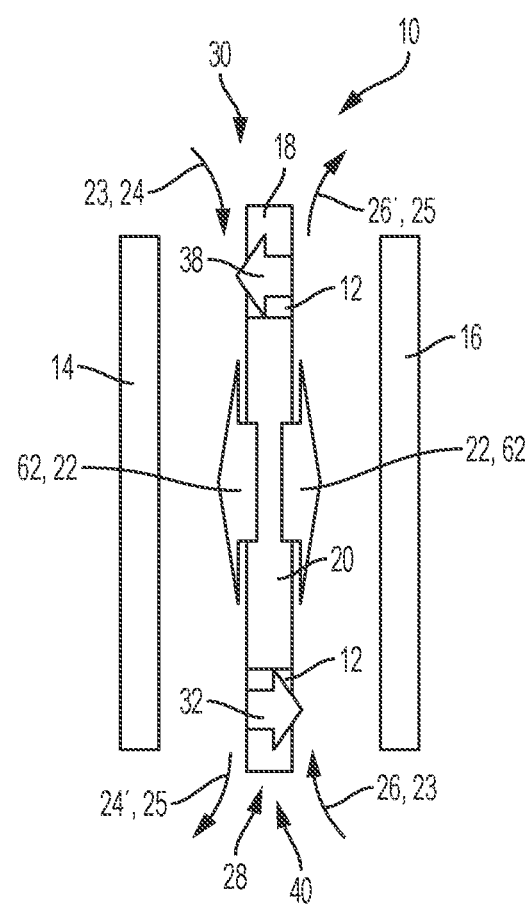
FIG. 3 is a schematic diagram of an example side view of an expanded fuel cell with the integrated water vapor transfer region.
Figure 4:
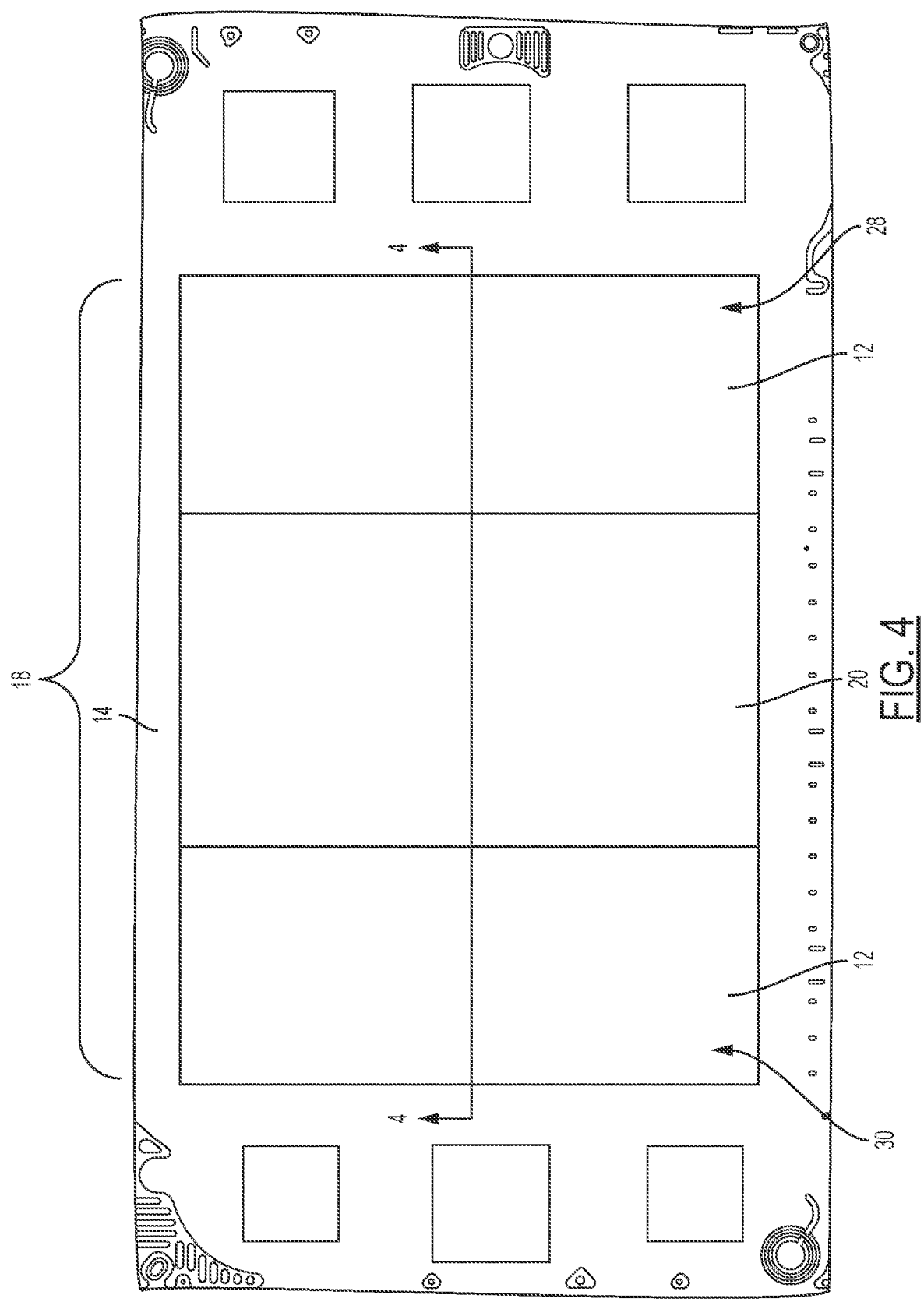
FIG. 4 is a diagram of a first example front view of a fuel cell with the integrated water vapor transfer region disposed onto a first bipolar plate.
Figure 5:
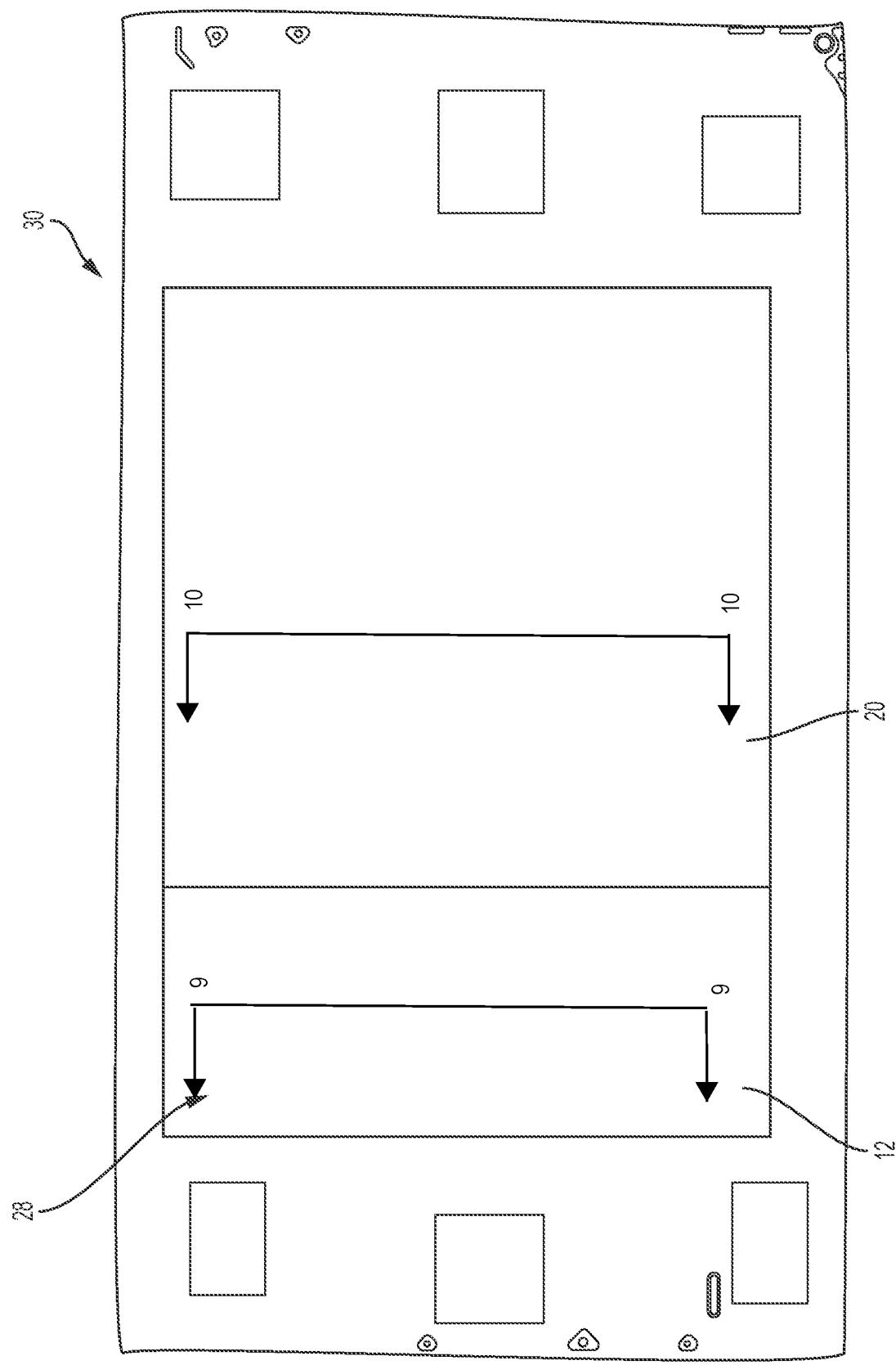
FIG. 5 is a diagram of a second example front view of a fuel cell with the integrated water vapor transfer region disposed onto a first bipolar plate.

Accordingly, with reference to FIG. 3, the present disclosure provides an integrated fuel cell 10 having a WVT region which is internal to the fuel cell. The fuel cell 10 of the present disclosure includes a water transfer portion 12 which is integrated in the membrane electrode assembly 18. The integrated fuel cell 10 includes a first bipolar plate 14, a second bipolar plate 16, and a membrane electrode assembly (MEA) 18 disposed between the first and second bipolar plates 14, 16 as shown in FIG. 3. With reference to FIGS. 3-5, the membrane electrode assembly 18 further includes a water vapor transfer portion 12 and an active area portion 20 configured to generate electricity 62 and provide a water byproduct 22 upon facilitating a reaction involving an input stream with hydrogen 24 and input airstream 26 with oxygen. It is understood that all references to input airstream 26 should be interpreted to mean that input airstream 26 contains oxygen.

Referring again to FIG. 3, at first MEA end 40, the water vapor transfer portion 12 of the membrane electrode assembly 18 may be hydrophilic relative to the active area portion 20 and is operatively configured to transfer moisture 32 from a primary stream 25 of fluid with higher relative humidity (such as but not limited output hydrogen stream 24') to a secondary stream 23 of fluid (such as but not limited to an input charged air stream 26 at first MEA end 28). Alternatively, water vapor transfer portion 12 at the second MEA end 30 may be configured to also transfer moisture 38 from a primary stream 25 of fluid (exhaust airstream 26') to a secondary stream 23 of fluid (input gaseous stream with hydrogen 24). It is understood that the primary stream 25 of fluid (exhaust airstream 26' or output hydrogen stream 24' or the like) is rich in moisture given that a water vapor byproduct 32, 38 results when the fuel cell generates electricity.

Figure 6A:
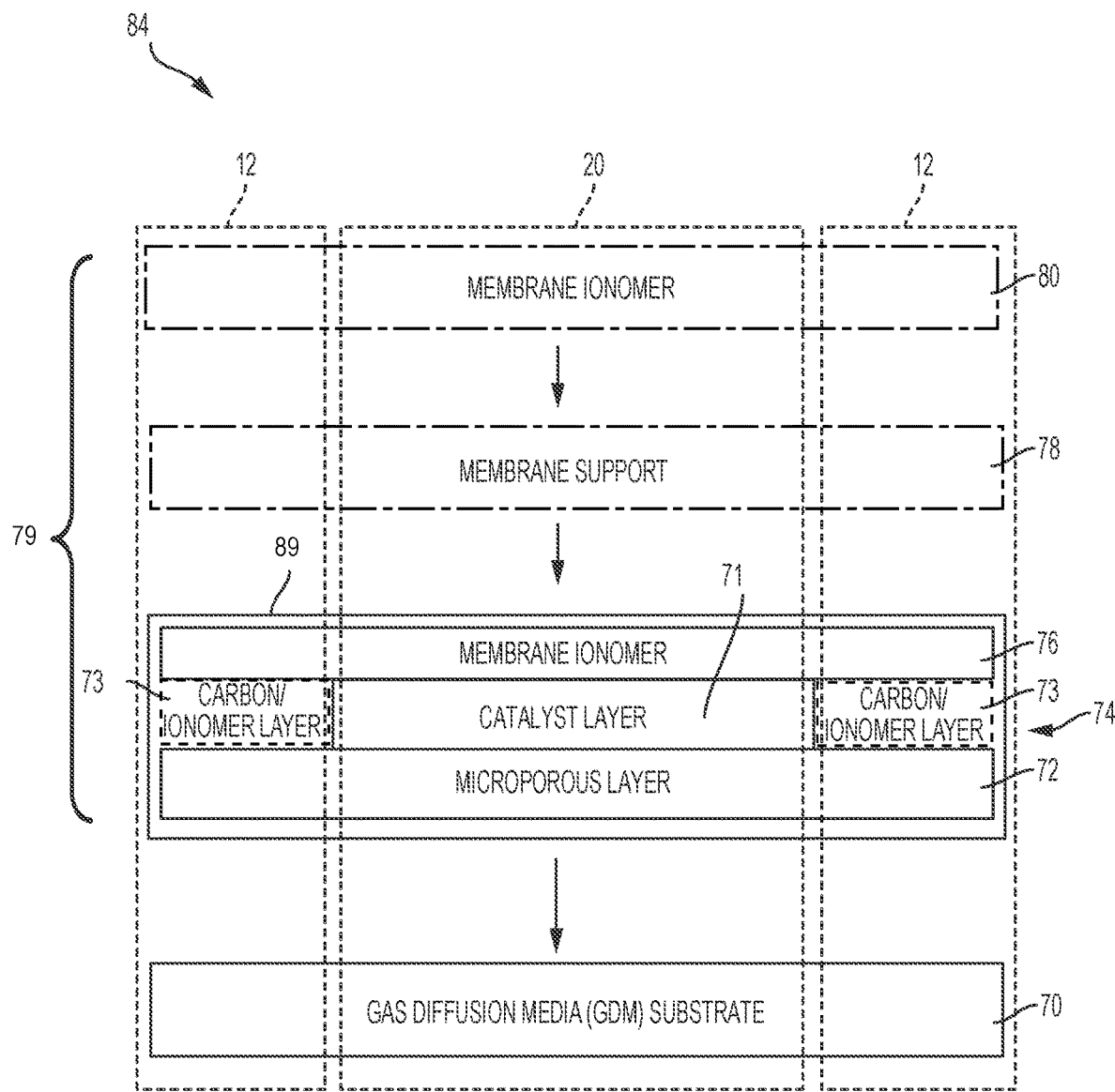
FIG. 6A is an expanded schematic view of a first embodiment method to manufacture an integrated water vapor transfer device and fuel cell.

Referring now to FIG. 6A, the present disclosure provides a first method for manufacturing an integrated MEA 18 which includes the following steps: (1) providing a substrate 70 having an AA region 20 and a WVT region 12; (2) simultaneously coating 89 a microporous layer 72, a catalyst layer 74 (either anode or cathode) onto the AA region 20, and a first membrane ionomer layer 76 onto the substrate 70; (3) applying an optional membrane support layer 78 to the first membrane ionomer layer 76 in the AA region 20 and the WVT region 12; (4) coating an optional second membrane ionomer layer 80 onto the membrane support layer 78 (or onto the first membrane ionomer layer 76 if the membrane support layer 78 is omitted); (5) heat treating the coated substrate 84 formed by the substrate 70 and the aforementioned plurality of layers 79 applied to the substrate 70; and (6) assembling the coated substrate 84 to a companion coated substrate 85. The companion coated substrate 85 is shown in FIG. 6C. However, it is understood that the catalyst-containing layer 74 of FIG. 6A may alternatively be stripe-coatedstripe-coated (as part of the simultaneous coating step) such that an AA catalyst layer 71 is applied solely to the AA region 20 and a mixed carbon/ionomer solution 73 is applied to the WVT region 12 of the microporous layer 72.

Therefore, it is understood that the coated substrate 84 may be formed upon applying the first membrane ionomer layer 76 as the final layer for the coated substrate 84. However, as another option, the membrane support layer 78 may optionally be applied to the first membrane ionomer layer 76 as the final layer thereby forming a coated substrate 84. Also, in yet a third option, the second membrane ionomer layer 80 may be applied as the final layer on top of the membrane support layer 78 thereby forming a coated substrate 84. In a fourth option, the second membrane ionomer layer 80 may be applied directly to the first membrane ionomer layer 76 as the final layer to the coated substrate 84—wherein the membrane support layer 78 would be omitted. The coated substrate 84 formed by the substrate 70 and a plurality of layers 79 (identified above) may then be heat treated and assembled to the companion coated substrate 85 (FIG. 6C).

As indicated, in the first aforementioned arrangement, the coated substrate 84 may be formed upon applying the first membrane ionomer 76. Under this arrangement, the first membrane ionomer layer 76 may include a reinforcement material such as, but not limited to short plastic or ceramic fibers. The short plastic and/or ceramic fibers may be mixed into the first membrane ionomer solution and sent through die coating tool in order to apply the first membrane ionomer layer 76 having such fibers/reinforcement material.

With respect to all embodiments of the present disclosure, the coated substrate 84 may be heat-treated before assembling the coated substrate 84 to a companion coated substrate 85. (FIG. 6C). A die coating tool 86 (FIG. 8) may be implemented to apply or coat the microporous layer 72, the catalyst-containing layer 74, and the first membrane ionomer layer 76 simultaneously onto the substrate 70 wherein the substrate 70 is a gas diffusion media. Moreover, with respect to all embodiments of the present disclosure, the WVT region 12 may be defined at a first end 28 of the substrate 70 with the AA region 20 being defined across the remainder of the substrate 70 in the middle region extending to the second end 30 of the substrate 70 as shown in FIG. 5. Alternatively, with respect to all embodiments of the present disclosure, the WVT region 12 may be defined at the first end 28 of the substrate 70 and at a second end 30 of the substrate 70 with the AA region 20 disposed therebetween as shown in FIG. 4. It is understood that the membrane support layer 78 implemented in all embodiments of the present disclosure, may but not necessarily, consist of expanded-polytetrafluoroethylene (ePTFE). Furthermore, in all of the embodiments having a WVT region 12 which is defined at both the first end 28 and the second end 30 with the AA region 20 in between, the catalyst layer 71 in the various embodiments may, but not necessarily, extend into one of the two WVT regions 12 (or may not extend into either of the WVT regions 12 at all).

Moreover, with respect to all embodiments in the present disclosure, each coated layer may be applied via a die coating process wherein each layer (except for the membrane support layer 78) may be coated onto the substrate 70. As previously indicated, the membrane support layer 78 may, but not necessarily, be an ePTFE material. Moreover, with respect to all embodiments of the present disclosure, each coated layer which is coated onto the substrate 70 may, but not necessarily, be heat-treated before the next layer is applied. In the present disclosure, the various embodiments refer to a microporous layer which should be construed to include, but not be limited to, a mixture of carbon black and a polymer binder in an alcohol/water solution that is coated and heat-treated. The term "alcohol/water solution" should be further construed to mean a solution which may have a content mixture which ranges from 100% alcohol and 0% to a solution having 0% alcohol and 100% water. Hydrophobic microporous layers may use a hydrophobic binder such as polytetrafluoroethylene. Hydrophilic microporous layers may use a hydrophilic binder such as an ionomer. Moreover, the present disclosure's reference to an "ionomer" should be construed to include, but not be limited to, a perfluorosulfonic acid. It is understood that the "ionomer layer" is perfluorosulfonic acid coated from an alcohol/water solution. The equivalent weight (EW) is a measure of the concentration of sulfonic acid sites with lower EW meaning high concentration of sulfonic acid sites.

Moreover, the present disclosure's reference to a "catalyst layer" should be construed to include, but not be limited to mixtures of Pt-based nanoparticles supported on electronically conductive supports (e.g. carbon) and an ionomer binder coated from an alcohol/water solution which is heat-treated to form the layer. References to a "carbon/ionomer layer" should be construed to include, but not be limited to mixtures of electronically conductive supports (e.g. carbon) and ionomer binder coated from an alcohol/water solution which is heat-treated to form the layer. Additionally, references to a "fuel cell membrane ionomer and WVT ionomer" should be construed to include but not be limited to meaning that the WVT ionomer would have a lower EW (higher concentration of sulfonic acid) than the fuel cell ionomer.

References to a "gas diffusion media" should be construed to include but not be limited to a carbon-fiber-based paper, bound chemically (e.g. with a resin binder) or mechanically (e.g. hydroentangled). Upon coating the gas diffusion media with the microporous layer, the combination of these elements may constitute the gas diffusion layer. Moreover, references to "short ceramic or plastic fibers" should be construed to include but not be limited to fibers which may have diameters of <1 micron and aspect ratio (length/diameter) of greater than 10.

Figure 6B:
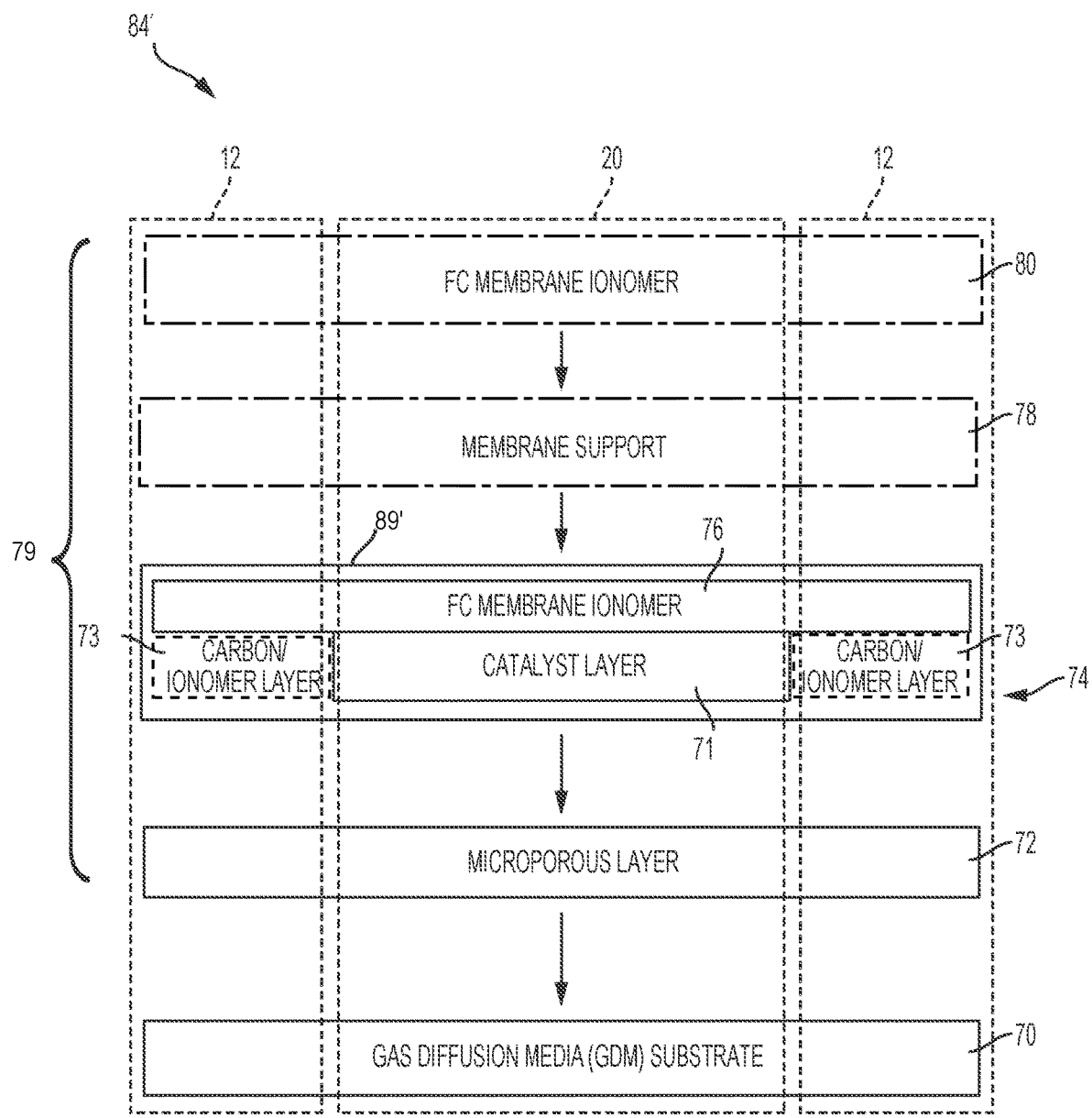
FIG. 6B is an expanded schematic view of a second embodiment method to manufacture an integrated water vapor transfer device and fuel cell.
Figure 6C:
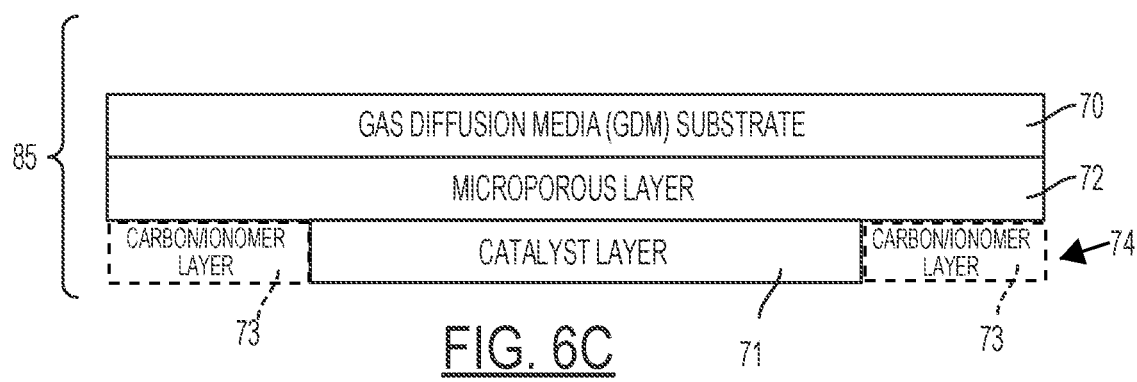
FIG. 6C is a schematic view of the companion coated substrate which would be assembled to the coated substrate in FIG. 6A.

With reference to FIGS. 6A and 6B, the catalyst-containing layer 74 may be coated to form a single AA catalyst layer 71 applied solely to the AA region 20. Alternatively, the catalyst-containing layer 74 may be stripe-coated stripe-coated wherein a single AA catalyst layer 71 is applied only in the AA while an optional mixed carbon-ionomer layer is applied in the WVT region 12. Therefore, the AA region 20 of the coated substrate 84 may include a substrate 70 layer, the microporous layer 72, the catalyst layer 74, the first membrane ionomer layer 76, the optional membrane support layer 78, and the optional second membrane ionomer 80. However, the WVT region 12 of the coated substrate 84 may include the substrate 70 layer, the microporous layer 72, the first membrane ionomer layer 76, the optional membrane support layer 78, and the optional second membrane ionomer 80. In the alternative, the WVT region 12 of the coated substrate 84 may include the substrate 70 layer, the microporous layer 72, the first membrane ionomer layer 76, the optional mixed carbon ionomer layer 73, the optional membrane support layer 78, and/or the optional second membrane ionomer 80. It is understood that all layers shown in phantom are optional layers which may or may not be included. Moreover, any combination of the optional layers may be used.

Referring now to FIG. 6B, a second embodiment of the present disclosure is provided wherein a method for manufacturing an integrated fuel-cell/WVT-region MEA may include the steps of: (1) providing a substrate 70 having an AA region 20 and a WVT region 12; (2) coating a microporous layer 72 across the substrate 70; (3) simultaneously coating 89' a catalyst-containing layer 74 and a first membrane ionomer layer 76 onto the microporous layer 72; (4) applying an optional membrane support layer 78 to the first membrane ionomer layer 76; (5) optionally applying a second membrane ionomer layer 80 onto the membrane support layer 78 (or onto the first membrane ionomer layer 76 if the membrane support layer 78 is omitted); (6) heat treating the coated substrate 84' formed by the substrate 70 and the aforementioned plurality of layers 79 applied to the substrate 70; and (7) assembling the coated substrate 84' to a companion coated substrate 85. It is understood that the catalyst-containing layer 74 is applied onto the microporous layer 72 in the AA region 20 as shown. However, it is understood that the catalyst-containing layer 74 of FIG. 6B may alternatively be stripe-coatedstripe-coated (as part of the simultaneous coating step 89') such that an AA catalyst layer 71 is applied solely to the AA region 20 and a mixed carbon/ionomer layer 73 is applied to the WVT region 12 of the microporous layer 72 as shown in FIG. 6B. The coated substrate 84' may then be heat-treated before assembling the coated substrate 84' to a companion coated substrate 85 (shown in FIG. 6C). A die coating tool 86 may be implemented to apply or coat the catalyst-containing layer 74 (which may or may not be stripe-coated as indicated above), and the first membrane ionomer layer 76 simultaneously onto the substrate 70 wherein the substrate 70 is a gas diffusion media.

Therefore, it is understood that the coated substrate 84' of FIG. 6B may be formed upon applying the first membrane ionomer layer 76 as the final layer to the coated substrate 84'. However, as another option, the membrane support layer 78 may optionally be applied to the first membrane ionomer layer 76 as the final layer thereby forming the coated substrate 84'. Also, in yet a third option, the second membrane ionomer layer 80 may be applied on top of the membrane support layer 78 as the final layer thereby forming a coated substrate 84'. In a fourth option, the second membrane ionomer layer 80 may be applied directly to the first membrane ionomer layer 76 thereby forming the coated substrate. Thus, the coated substrate 84' may be formed by the substrate 70 and any combination of the plurality of layers 79 (identified above) which will then be heat treated and assembled to the companion coated substrate 85. The companion coated substrate 85 for the coated substrate 84, 84' also includes a substrate 70 (FIG. 6C), a microporous layer 72, and a catalyst layer 74. Similar to the coated substrate 84, 84' of FIGS. 6A and 6B, the catalyst-containing layer 74 of the companion coated substrate 85 may or may not be stripe-coatedstripe-coated as shown in FIG. 6C.

In the first aforementioned arrangement, the coated substrate 84' may be formed upon applying the first membrane ionomer layer 76 as the final layer in the simultaneous coating step 89'. Under this arrangement, the first membrane ionomer layer 76 of FIG. 6B may include a reinforcement material such as, but not limited to, short plastic or ceramic fibers. The short plastic and/or ceramic fibers may be mixed into the first membrane ionomer solution which is then sent through a die coating tool to apply the first membrane ionomer layer 76.

In the second embodiment of FIG. 6B, the AA region 20 of the coated substrate 84' may include the substrate 70 layer, the microporous layer 72, the catalyst-containing layer 74, the first membrane ionomer layer 76, the optional membrane support layer 78, and the optional second membrane ionomer 80. The WVT region 12 of the coated substrate 84' may include the substrate 70 layer, the microporous layer 72, an optional mixed carbon-ionomer layer 73, the first membrane ionomer layer 76, the optional membrane support layer 78, and the optional second membrane ionomer layer 80.

Figure 7A:
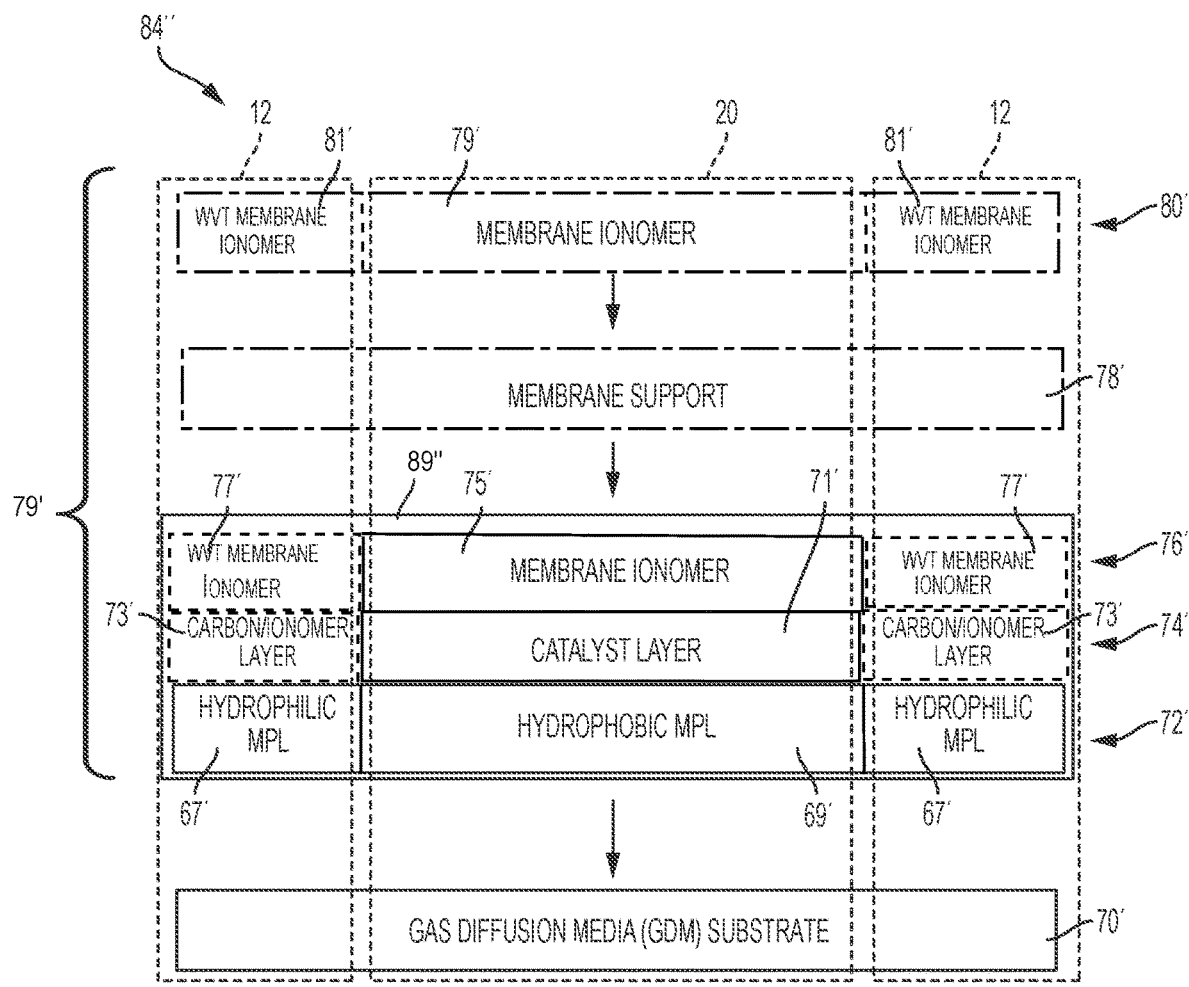
FIG. 7A is an expanded schematic view of a third embodiment method to manufacture an integrated water vapor transfer device and fuel cell.

Referring now to FIG. 7A, the third embodiment of the present disclosure is provided wherein the method for manufacturing an integrated fuel-cell/WVT-region MEA 18 (FIG. 4) may include the steps of: (1) providing a substrate 70' having an AA region 20 and a WVT region 12; (2) simultaneously applying 89'' a stripe-coated microporous layer (MPL) 72', a catalyst-containing layer 74' (which may or may not be stripe-coated), and a first membrane ionomer layer 76' (which may or may not be stripe-coated) onto the substrate 70'; (3) applying an optional membrane support layer 78' onto the first membrane ionomer layer 76'; (4) optionally applying a second membrane ionomer layer 80' (which may or may not be stripe-coated) thereby forming a coated substrate 84''; and (5) assembling the coated substrate 84'' to a companion coated substrate 85' (FIG. 7C). In this third embodiment of FIG. 7A, the stripe-coated microporous layer 72' may be hydrophobic 69' in the AA region 20 and hydrophilic 67' in the WVT region 12 while the catalyst-containing layer 74' includes a catalyst layer 71' which is solely disposed in the AA region 20 and may or may not include a mixed carbon/ionomer layer 73' solely disposed in the WVT region(s) 12. The first membrane ionomer layer 76' (which may or may not be stripe-coated) may include the first fuel cell membrane ionomer layer 75' in the AA region 20 and optionally a first WVT membrane ionomer layer 77' in the MT region 12 as shown in FIG. 7A. The optional second membrane ionomer layer 80' may include a second fuel cell membrane ionomer layer 79' in the AA region and an optional second WVT membrane ionomer layer 81' in the WVT region 12. Accordingly, it is understood that certain layers such as the optional second membrane ionomer layer 80' may or may not be stripe-coated depending upon whether the optional solution (ex: WVT membrane ionomer) is applied in the MT region.

Therefore, it is understood that the coated substrate 84'' may be formed upon applying the first membrane ionomer layer 76' which may or may not be stripe-coated as shown in FIG. 7A. However, as another option, the membrane support layer 78' may optionally be applied to the first membrane ionomer layer 76' (which may or may not be stripe-coated) thereby forming a coated substrate 84''. Also, in yet a third option, the second membrane ionomer layer 80' (which may or may not be stripe-coated) may be applied on top of the membrane support layer 78' as the final layer thereby forming a coated substrate 84''. In a fourth option, the second membrane ionomer layer 80' may be applied directly to the first membrane ionomer layer 76'. The coated substrate 84'' formed by the substrate 70' and a plurality of layers (identified above) 79' may then be heat treated and assembled to the companion coated substrate 85'. As shown in FIG. 7C, the companion coated substrate 85' for coated substrate 84'', 84''' of FIGS. 7A and 7B also includes a substrate 70', a microporous layer 72' which may or may not be stripe-coated as shown, and a catalyst-containing layer 74' which also may or may not be stripe-coated as explained above for the coated substrate 84'' (and below for the coated substrate 84''').

As indicated, in the first aforementioned arrangement for the third embodiment, the coated substrate 84'' may be formed upon applying the first membrane ionomer layer 76'. Under this arrangement, the first membrane ionomer layer 76' may include reinforcement material such as, but not limited to, short plastic or ceramic fibers. The short plastic and/or ceramic fibers may be mixed into the first membrane ionomer solution 76' and sent through a die-coating tool to apply the first membrane ionomer layer 76'.

In the embodiment shown in FIG. 7A, the AA region 20 of the coated substrate 84'' includes a substrate 70' layer, the hydrophobic MPL 69', the catalyst layer 71', the first fuel cell membrane ionomer layer 75', the optional membrane support layer 78', and the optional second fuel cell membrane ionomer layer 80'. The WVT region 12 of the coated substrate 84'' may include a substrate 70' layer, the optional hydrophilic MPL 67', an optional mixed carbon/ionomer layer 73', the first membrane ionomer layer with optional WVT membrane ionomer layer 77', the optional membrane support layer 78', and the optional second WVT membrane ionomer layer 81'. With reference to FIG. 7A, it is understood that the optional mixed carbon/ionomer layer 73' may be disposed in the WVT region 12 when the catalyst-containing layer 74' is stripe-coated to the stripe-coated microporous layer 72'.

Figure 7B:
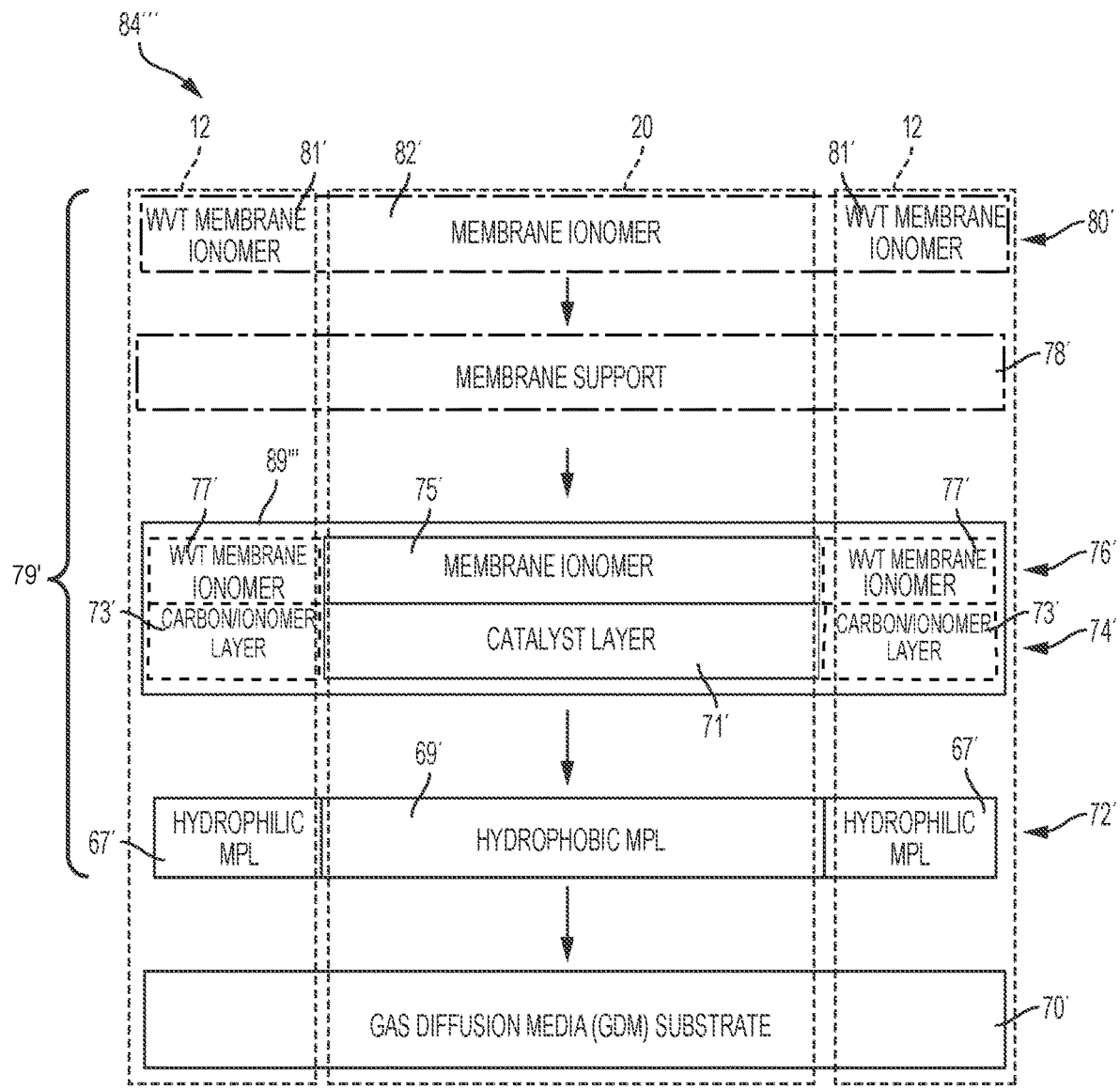
FIG. 7B is an expanded schematic view of a fourth embodiment method to manufacture an integrated water vapor transfer device and fuel cell.
Figure 7C:
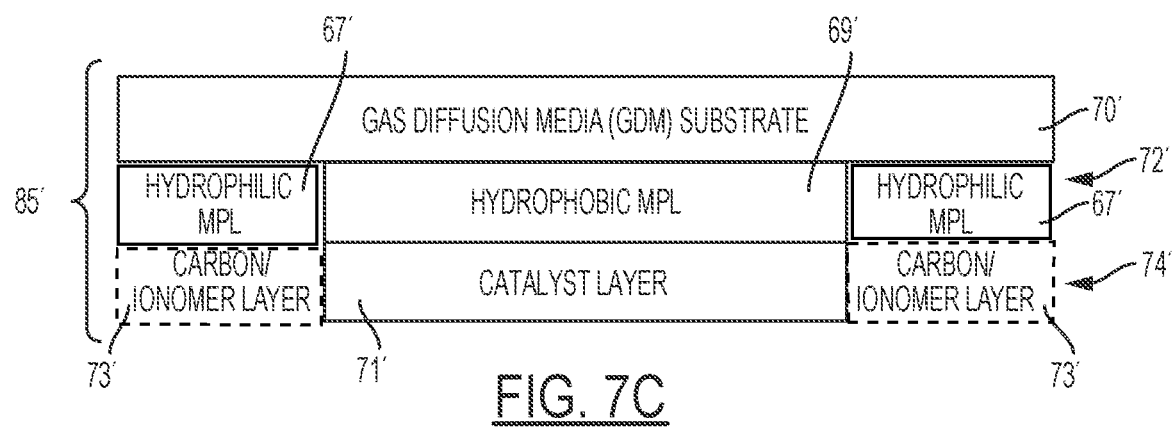
FIG. 7C is a schematic view of the companion coated substrate which would be assembled to the coated substrate in FIG. 7A.

Referring now to FIG. 7B, fourth embodiment of the present disclosure includes a method for manufacturing an integrated fuel-cell/WVT-region MEA 84''' includes the steps of: (1) providing a substrate 70' having an AA region 20 and a WVT region 12; (2) providing a stripe-coated microporous layer 72' onto the substrate 70' in the AA region 20 and the WVT region 12; (3) simultaneously applying 89''' a catalyst-containing layer 74', and a first membrane ionomer layer 76'; (4) applying an optional membrane support layer 78' onto the coated membrane ionomer layer 76'; (5) optionally coating the second membrane ionomer layer 80' onto the membrane support layer 78' (or onto the first stripe-coated membrane ionomer layer 76' if the membrane support layer 78' is omitted); (6) heat treating the coated substrate 84''' formed by the substrate 70' and the aforementioned plurality of layers 79' applied to the substrate 70'; and (7) assembling the coated substrate 84''' to a companion coated substrate 85', The aforementioned stripe-coated microporous layer 72' may arranged such that a hydrophobic MPL 69' is disposed in the AA region 20 and a hydrophilic MPL 67' is disposed in the MT region 12. Similarly, the catalyst-containing layer 74' may include a catalyst layer 71' solely applied to the AA region 20 and the optional mixed carbon/ionomer layer 73' solely applied to the WVT region 12 such that the catalyst-containing layer 74 is stripe-coated during the simultaneous coating step 89'''. As indicated, the first membrane ionomer layer 76' of this embodiment may be stripe-coated such that a first fuel cell membrane ionomer layer 75' is applied to the AA region 20 and a first WVT membrane ionomer layer 77' is applied in the WVT region 12. Similarly, the second membrane ionomer layer 80' may optionally be stripe-coated such that a second membrane ionomer layer 82' is applied to the AA region 20 and a second WVT membrane ionomer layer 81' is applied to the WVT region 12 when the simultaneous coating step 89''' occurs.

Therefore, it is understood that the coated substrate 84''' may be formed upon applying the first membrane ionomer layer 76' given that the membrane support layer 78' is optional. Moreover, the stripe-coated microporous layer 72' may be hydrophobic 69' in the AA region 20 and hydrophilic 67' in the WVT region 12 while the catalyst-containing layer 74' includes a catalyst layer 71' which is solely disposed in the AA region 20 and may or may not include a mixed carbon/ionomer layer 73' solely disposed in the WVT region(s) 12. The first membrane ionomer layer 76' (which may or may not be stripe-coated) may include the first membrane ionomer layer 75' in the AA region 20 and optionally a first WVT membrane ionomer layer 77' in the WVT region 12 as shown in FIG. 7B. The optional second membrane ionomer layer 80' may include a second fuel cell membrane ionomer layer 82' in the AA region and an optional second WVT membrane ionomer layer 81' in the WVT region 12. Accordingly, it is understood that certain layers such as the optional second membrane ionomer layer 80' may or may not be stripe-coated depending upon whether the optional solution (ex: WVT membrane ionomer) is applied in the WVT region.

In one option for the coated substrate 84''' of FIG. 7B, the membrane support layer 78' may optionally be applied to the first membrane ionomer layer 76' as the final layer for the coated substrate 84'''. However, in a second option, the second membrane ionomer layer 80' may be applied on top of the membrane support layer 78' thereby forming a coated substrate 84'''. In a third option, the second membrane ionomer layer 80' may be applied directly to the first membrane ionomer layer 76'. Again, it is understood that layers 74', 76', 80' may or may not be stripe-coated. The coated substrate 84''' formed by the substrate 70' and any combination of the plurality of layers 79' (as described above) may then be heat treated and assembled to the companion coated substrate 85'.

In the first aforementioned arrangement, the coated substrate 84''' may be formed upon applying the first stripe-coated membrane ionomer layer 76' as the final layer for the coated substrate 85'. Under this arrangement, the first membrane ionomer layer 76' may include a reinforcement material such as, but not limited to, short plastic or ceramic fibers. The short plastic and/or ceramic fibers may be mixed into the first membrane ionomer solution which is then sent through die-coating tool in order to apply the first membrane ionomer layer 76'.

In the fourth embodiment shown in FIG. 7B, the AA region 20 of the coated substrate 84''' includes a substrate layer 70', the hydrophobic microporous layer 69', the catalyst layer 71', the first fuel cell membrane ionomer layer 75', the optional membrane support layer 78', and the optional second fuel cell membrane ionomer 82'. The WVT region 12 of the coated substrate 84''' may include the substrate layer 70', the hydrophilic MPL 67', the optional mixed carbon/ionomer layer 73', the optional first WVT membrane ionomer layer 77', the optional membrane support layer 78', and the optional second WVT membrane ionomer layer 81'.

Figure 8:
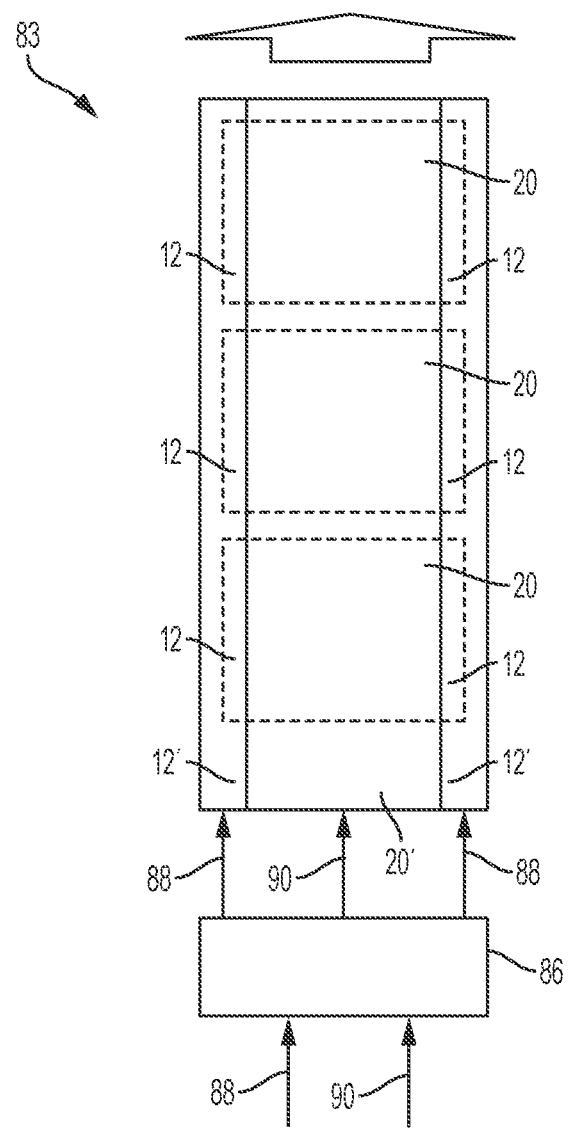
FIG. 8 depicts an example, non-limiting stripe coating step according to various embodiments of the present disclosure wherein the substrate is illustrated in a plan view.

With reference to FIG. 8, the stripe coating step of the various embodiments is shown wherein a die coating tool 86 accepts WVT solution 88 as well as AA solution 90. WVT solution 88 may be any of the aforementioned solutions/layers which are dedicated to the WVT region 12' of the substrate roll 83 during a stripe-coating step (or WVT region 12 of the coated substrate). In doing so, a particular layer may be stripe-coated. AA solution may be any of the aforementioned solutions/layers which are dedicated to the AA region 20' of the substrate roll 83 during a stripe-coating step (or AA region 20 of the coated substrate). As shown in FIG. 8, the die coating tool 86 is configured to distribute the aforementioned solutions to their dedicated regions as shown as the substrate roll 83 moves away from the die coating tool.

With reference to FIG. 9, an expanded view of an example cross-section of a WVT region 12 of an MEA 18 (along line 9-9 in FIG. 5) is shown wherein the MEA 18 is formed by assembling the companion coated substrate 85 to the coated substrate 84. Similarly, with reference to FIG. 10, an expanded view of an example cross-section of an AA region 20 of an MEA 18 (along line 10-10 in FIG. 5) is shown wherein the MEA 18 is formed by assembling the companion coated substrate 85 to the coated substrate 84. The AA region primarily differs from the WVT region at least by the fact that the AA region includes two catalyst layers. The proton exchange membrane 73 is a layer which is formed by the first and optional second membrane ionomer layers 76, 80 (as described in all of the embodiments of the present disclosure) with the optional membrane support layer 78 disposed there between.

While multiple exemplary embodiments have been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for manufacturing an integrated membrane electrode assembly (MEA) for a fuel cell with an integrated water vapor transfer (WVT) device, the method comprising:
   providing a substrate including a gas diffusion media and having an active area (AA) portion and a WVT portion adjacent the AA portion;
   simultaneously coating a microporous layer, a catalyst-containing layer, and a first membrane ionomer layer onto the AA and WVT portions of the substrate to form a coated substrate with an AA region and a WVT region, the catalyst-containing layer including a catalyst layer solely applied to the AA region and a mixed carbon/ionomer layer solely applied to the WVT region, wherein the WVT region is hydrophilic and configured to transfer moisture therethrough, and the AA region is hydrophobic and configured to prevent the transfer of moisture therethrough;
   heat-treating the coated substrate formed by coating the microporous, catalyst-containing, and first membrane ionomer layers onto the substrate; and
   assembling the coated substrate to a companion coated substrate.

2. The method of claim 1, further comprising applying a membrane support layer onto the first membrane ionomer layer.

3. The method of claim 2, further comprising coating a second membrane ionomer layer onto the membrane support layer.

4. The method of claim 3, wherein the AA region is defined, at least in part, by the substrate, the microporous layer, the catalyst layer of the catalyst-containing layer, the first membrane ionomer layer, the membrane support layer, and the second membrane ionomer layer.

5. The method of claim 4, wherein the WVT region is defined, at least in part, by the substrate, the microporous layer, the mixed carbon/ionomer layer of the catalyst-containing layer, the first membrane ionomer layer, the membrane support layer, and the second membrane ionomer layer.

6. The method of claim 5, wherein the WVT region consists essentially of the substrate, the microporous layer, the mixed carbon/ionomer layer, the first membrane ionomer layer, the membrane support layer, and the second membrane ionomer layer.

7. The method of claim 2, wherein the membrane support layer is formed from expanded polytetrafluoroethylene (ePTFE).

8. The method of claim 1, wherein a die coating tool applies the microporous layer, the catalyst-containing layer, and the first membrane ionomer layer simultaneously onto the substrate.

9. The method of claim 1, further comprising:
   attaching a first bipolar plate to a first side of the integrated MEA formed, at least in part, by the assembling the coated substrate to the companion coated substrate; and
   attaching a second bipolar plate to a second side of the integrated MEA opposite the first side.

10. The method of claim 1, wherein the WVT region includes first and second discrete WVT portions sandwiching therebetween the AA region.

11. The method of claim 10, wherein the first and second discrete WVT portions are located at opposing first and second ends, respectively, of the substrate.

12. The method of claim 11, wherein the mixed carbon/ionomer layer is applied solely to the first and second discrete WVT portions.

13. The method of claim 1, wherein the microporous layer is located directly against the substrate, the catalyst-containing layer is located directly against the microporous layer, and the first membrane ionomer layer is located directly against the catalyst-containing layer.

14. The method of claim 1, wherein the gas diffusion media of the substrate includes a carbon-fiber-based paper bound chemically via a resin binder or mechanically via hydroentanglement.

15. The method of claim 1, wherein the microporous layer includes a mixture of carbon black and a polymer binder in an alcohol and water solution.

16. The method of claim 1, wherein the first membrane ionomer layer includes a perfluorosulfonic acid coated from an alcohol and water solution.

17. The method of claim 1, wherein the catalyst-containing layer includes nanoparticles supported on an electronically conductive support.

18. The method of claim 1, wherein the companion coated substrate includes a second substrate coated with a second microporous layer and a second catalyst-containing layer.

19. The method of claim 18, wherein the second microporous layer is located directly against the second substrate, and the second catalyst-containing layer is located directly against the second microporous layer.

20. The method of claim 19, wherein the microporous layer is located directly against the substrate, the catalyst-containing layer is located directly against the microporous layer, the first membrane ionomer layer is located directly against the catalyst-containing layer, and the second catalyst-containing layer is located directly against the first membrane ionomer layer.

21. A method for manufacturing an integrated membrane electrode assembly (MEA) for a fuel cell with an integrated water vapor transfer (WVT) device, the method comprising:
   providing a substrate including a gas diffusion media and having an active area (AA) portion and a WVT portion adjacent the AA portion;
   coating a microporous layer across the AA and WVT portions of the substrate;
   coating a catalyst-containing layer onto the microporous layer;
   coating a first membrane ionomer layer onto the catalyst-containing layer such that the microporous, catalyst-containing, and first membrane ionomer layers coated onto the AA and WVT portions of the substrate form a coated substrate with an AA region and a WVT region;
   applying a membrane support layer onto the first membrane ionomer layer;
   applying a second membrane ionomer layer onto the membrane support layer, the WVT region being defined, at least in part, by the substrate, the microporous layer, the first membrane ionomer layer, the membrane support layer, and the second membrane ionomer layer;

heat-treating the coated substrate formed by the substrate and the layers applied to the substrate; and assembling the coated substrate to a companion coated substrate.

22. The method of claim 3, wherein the catalyst-containing layer includes a catalyst layer solely applied to the AA region and a mixed carbon/ionomer layer solely applied to the WVT region.

23. The method of claim 21, wherein the AA region is defined, at least in part, by the substrate, the microporous layer, the catalyst-containing layer, the first membrane ionomer layer, the membrane support layer, and the second membrane ionomer layer.

24. A method for manufacturing an integrated membrane electrode assembly (MEA) for a fuel cell with an integrated water vapor transfer (WVT) device, the method comprising:

providing a substrate including a gas diffusion media and having an active area (AA) portion and a WVT portion adjacent the AA portion;

coating a microporous layer, a catalyst-containing layer, and a first membrane ionomer layer onto the AA and WVT portions of the substrate to form a coated substrate with an AA region and a WVT region, wherein the WVT region is hydrophilic and configured to transfer moisture therethrough, and the AA region is hydrophobic and configured to prevent the transfer of moisture therethrough, and wherein the microporous layer in the WVT region is a hydrophilic microporous layer with a hydrophilic binder, and the microporous layer in the AA region is a hydrophobic microporous layer with a hydrophobic binder;

heat-treating the coated substrate formed by coating the microporous, catalyst-containing, and first membrane ionomer layers onto the substrate; and assembling the coated substrate to a companion coated substrate.

25. The method of claim 24, further comprising applying a membrane support layer onto the first membrane ionomer layer.

26. The method of claim 25, further comprising applying a second membrane ionomer layer onto the membrane support layer.

27. The method of claim 26, wherein the WVT region is defined, at least in part, by the substrate, the microporous layer, the first membrane ionomer layer, the membrane support layer, and the second membrane ionomer layer.

* * * * *